United States Patent Office 3,758,292
Patented Sept. 11, 1973

3,758,292
METHOD OF QUENCHING SLAG
John B. Kuntz, Monroeville, and Anthony A. Spinola, Penn Hills Township, Allegheny County, Pa., assignors to United States Steel Corporation
No Drawing. Filed May 21, 1971, Ser. No. 145,966
Int. Cl. C21b 3/08
U.S. Cl. 75—24
5 Claims

ABSTRACT OF THE DISCLOSURE

A method of reducing hydrogen sulfide emission during the quenching of hot blast furnace slag. More particularly, the addition of an alkali or alkaline earth metal or aluminum oxide or carbonate to the water used to quench molten blast furnace slag is found to reduce hydrogen sulfide emission.

BACKGROUND OF THE INVENTION

Blast furnace slag, depending upon its chemical composition and the physical form in which it is permitted to solidify, has many uses. Three general physical types are produced by different methods of cooling from the molten state, i.e. air-cooled, granulated, and expanded. Air-cooled slag, the "crushed slag" of commerce, is prepared by pouring the molten slag onto a slag bank or into a pit where it is allowed to solidify. Granulated slag is prepared by three general methods: pit, jet or dry granulation. Pit granulation consists of running the molten slag directly into a pit of water. In the jet process, the molten stream of slag is broken up by a high-pressure water jet as it falls into the pit, and the granulated slag falls into the water in the pit to be further quenched. Dry granulated slag is made in a mechanical device using small amounts of water. Expanded or lightweight slag is the foamed product produced when hot slag is expanded by applying a limited quantity of water or a combination of water and air or steam.

In each of the above processes, with the exception of the first, water is used to quench the hot slag. The contact of the hot slag with the cooling water produces steam which along with volatile matter formed during the quenching operation escapes into the atmosphere, in some instances causing severe pollution problems. One of the more insistent pollutants produced in the quenching operation, detectable in extremely low concentration in the atmosphere, is hydrogen sulfide, $H_2S$. Although the reactions which result in the formation of $H_2S$ are not fully understood, they are believed to be between sulfur compounds in the hot slag and water.

Larger quantities of hydrogen sulfide are evolved when the slag is at a high temperature; however, even at the relatively low temperatures which air-cooled slag may reach after a period at the slag site, the mere contact of moist air or rain with the cooled slag will evolve appreciable quantities of hydrogen sulfide.

Thus, there exists a need to provide a method of quenching hot slag whereby the evolution of volatile materials, especially hydrogen sulfide, which are generated during the quenching operation is reduced or eliminated. It is an object of this invention to provide such a method.

SUMMARY OF THE INVENTION

Accordingly, we have discovered a method of reducing the evolution of hydrogen sulfide normally generated during the quenching of slag by quenching the hot slag with an aqueous solution containing an anti-emission agent which preferentially reacts with the sulfur compounds in the slag, thus effectively preventing or reducing the formation of hydrogen sulfide. The anti-emission agents of our invention are alkali and alkaline earth metal and aluminum oxides and carbonates.

DETAILED DESCRIPTION

In our process, the anti-emission agent selected from the alkali and alkaline earth metal and aluminum oxides and carbonates is added to the water to be used to quench the slag. The addition may be done in any suitable way. If a solid anti-emission agent is used, it may be first dissolved in a small quantity of water and then added to the main water supply in the necessary amount, or it may be added directly to the water supply in solid form. If a liquid anti-emission agent is used, it may be added to the quench water at any time prior to use. Preferably, it is added just prior to use by metering it into the water stream as it flows through a pipe.

No changes in the ordinary quench procedure are necessary. The only difference is the use of a water solution of an anti-emission agent in place of water. The same amount of water ordinarily used is used in our process.

The quantity of hydrogen sulfide evolved is dependent upon the initial temperature of the slag, the sulfur content of the slag (typically between 0.75 and 2.25 percent by weight), and the final temperature. Where the initial temperature of the slag is about 2200–2400° F., the sulfur content is in the typical range and the final temperature is at or slightly above ambient, hydrogen sulfide emission is in the range of 10,000 to 20,000 parts per million (p.p.m.) by volume. A generally useful anti-emission agent should lower the hydrogen sulfide emission to a maximum of about 500 p.p.m.

The anti-emission agents of our invention are the alkali and alkaline earth metal and aluminum oxides and carbonates. Preferred agents are aluminum oxide, calcium oxide and sodium carbonate. The aqueous solution of the anti-emission agent is the quench-anti-emission medium. Best results are obtained when the concentration of the anti-emission agent in the quench water is at least 3 percent by weight. However, satisfactory results are also obtained using saturated solutions of those anti-emission agents which are only slightly soluble in water, as for example, $Al_2O_3$.

Although we have not confirmed the mechanism involved, we believe that our anti-emission agents prevent the emission of hydrogen sulfide by reacting with the hydrogen sulfide that is formed upon contact of the slag and water. It is postulated that our anti-emission agents acting as bases neutralize the acidic hydrogen sulfide to yield a soluble metal sulfide. Regardless of the mechanism involved, the anti-emission agents of our invention act to retard the emission of hydrogen sulfide thereby reducing the pollution normally associated with slag quenching operations.

The invention is further illustrated by the following example:

Example

One hundred grams (g.) of blast furnace slag ground to minus 20 mesh and containing about 1.35 weight percent sulfur was transferred to a graphite crucible. The crucible was placed in an electric furnace capable of reaching a temperature of 2500° F. The furnace was then flushed with argon to provide an inert atmosphere and thereby prevent the formation of oxides of sulfur.

To quench the hot slag a quick sealing reaction chamber was designed. The reaction chamber consisted of a 11.29 liter stainless steel cylinder, spraying apparatus for introduction of the quench medium, and a port for introduction of the slag. The chamber was air-tight.

The furnace was activated and the slag heated to the desired temperature in the inert atmosphere. Concurrently, the reaction chamber and sampling systems were evacuated. The sampling system was isolated from the reaction chamber which was opened to allow admittance of the slag sample. As the heated crucible containing molten slag was quickly introduced into the reaction chamber, an optical pyrometer reading of the temperature was taken. The chamber was sealed and after opening the valve to the sampling system, the entire system was evacuated to 25 mm. mercury absolute.

The quench medium was applied to the slag as a fine mist through spray apparatus. The gases evolved from the reaction passed through a glass-wool demister screen to remove entrained water mist. When the slag surface temperature reached about 200° F., the sampling valves on the gas sample tube were opened and the gases were passed to the chromatograph for analysis.

Table I tabulates the results obtained using (1) various quench media and (2) different slag temperatures at the moment of quench.

TABLE I

| Quench media | Surface temperature of slag (° F.) | Hydrogen sulfide formed, percent by volume |
|---|---|---|
| Test number: | | |
| 1 ........ Tap water ........ | 600 | 0.0022 |
| 2 ........ do ........ | 690 | 0.0025 |
| 3 ........ do ........ | 810 | 0.0018 |
| 4 ........ do ........ | 840 | 0.0024 |
| 5 ........ do ........ | 1,090 | 0.0090 |
| 6 ........ do ........ | 1,550 | 0.0090 |
| 7 ........ do ........ | 1,760 | 0.0072 |
| 8 ........ do ........ | 2,040 | 0.2450 |
| 9 ........ do ........ | 2,280 | 1,0290 |
| 10 ........ Saturated aqueous CaO ........ | 2,210 | 0.0441 |
| 11 ........ Saturated aqueous $Al_2O_3$ ........ | 2,400 | 0.0059 |
| 12 ........ 3% aqueous $Na_2CO_3$ ........ | 2,410 | 0.0065 |

These results show that when the aqueous solution of the anti-emission agent is saturated with said anti-emission agent or where the concentration of said anti-emission agent is at least 3 percent by weight, the amount of hydrogen sulfide emitted decreases at least 50 fold from the amount emitted when no anti-emission agent is present. This massive reduction in hydrogen sulfide emission is more than sufficient in most cases to lower the emission to acceptable levels.

These results also show that when the slag temperature is relatively low, the amount of hydrogen-sulfide emitted decreases. Thus, it is possible, when using relatively cool slag such as air-cooled slag to decrease the concentration of the anti-emission agent below 3 weight percent.

We claim:

1. A method of reducing the emission of hydrogen sulfide formed during the quenching of hot blast furnace slag comprising contacting the slag with a quench-anti-emission medium comprising an aqueous solution of an anti-emission agent selected from aluminum carbonates and oxides.

2. The method of claim 1 wherein the concentration of the anti-emission agent is at least 3 percent by weight.

3. The method of claim 1 wherein the anti-emission agent is aluminum oxide.

4. The method of claim 1 wherein the quench-anti-emission medium is a saturated aqueous solution of the anti-emission agent.

5. The method of claim 1 wherein the anti-emission agent is aluminum carbonate.

References Cited

UNITED STATES PATENTS 2,023,511  12/1935  Brosius ............... 65—20
1,962,270  6/1934  Dunn ............... 106—51

OTHER REFERENCES

Nordell, E.: Water Treatment, Reinhold Pub., 2nd Ed., Oct. 18, 1961, p. 36 relied on.

L. DEWAYNE RUTLEDGE, Primary Examiner

M. J. ANDREWS, Assistant Examiner

U.S. Cl. X.R.

75—0.5 C; 65—20; 264—11